United States Patent Office 3,268,324
Patented August 23, 1966

3,268,324
HERBICIDAL COMPOSITION AND METHOD EMPLOYING OXA ALIPHATIC ACETAMIDE
Philip C. Hamm, Webster Groves, and Angelo John Speziale, Creve Coeur, Mo., assignors to Monsanto Company, St. Louis, Mo., a corporation of Delaware
No Drawing. Filed Oct. 11, 1965, Ser. No. 494,929
12 Claims. (Cl. 71—2.3)

This specification is a continuation-in-part of our applications Serial Nos. 389,491, 389,492, 389,493, all filed October 30, 1953, and all now abandoned, 455,735 (now U.S. 2,864,683), 455,736 (now U.S. 2,864,679), 455,737, now abandoned, 455,740 (now U.S. 2,863,752), all filed September 13, 1954, 556,102 filed December 29, 1955, now abandoned, 716,010, filed February 19, 1958, now abandoned, and 129,947, filed August 8, 1961.

This invention relates to new herbicidal compounds and methods for their use. More particularly, this invention relates to methods of inhibiting the growth of grasses in the presence of other vegetation.

Many chemical compounds are known to be deleterious to the growth of vegetation and to have herbicidal effects under specific conditions, some of which are known to be quite effective at low levels of application. It is, however, a more difficult problem to provide useful herbicides for selective activity on undesirable plants, but which are harmless to other vegetation. Compounds of this type are known, being primarily useful in eliminating broadleaf plants from grasses or grass-like cereal crops. This herbicidal activity is frequently related to the leaf area exposed to the herbicides, the plants with larger leaf areas being more susceptible to the contact herbicides.

In copending applications of earlier date of which the present application is a continuation-in-part, it has been shown that certain alpha-haloacetamides are excellent herbicides, particularly with respect to grasses. It has also been shown that the alpha-haloacetamides must have small substituents on the amide nitrogen atom to be herbicidal. Homologous compounds without substituents, or with substituents larger than a critical size, do not have the herbicidal properties. The alpha-haloacetamides with one or two aliphatic substituents with a chain length of not greater than six carbon atoms are herbicidal. Moreover, cyclic structures, such as phenyl, cyclohexyl, furfuryl, thenyl, or the substituted homologs, have specific limitations in herbicidal properties.

It is the primary purpose of this invention to provide a new and useful class of herbicides having both contact and pre-emergence herbicidal properties. A further purpose of the invention is to provide methods of destroying grasses in the presence of broadleaf crops. A still further purpose of the invention is to provide new chemical compounds having valuable properties hereinafter described more fully.

It has now been found that if the aliphatic substituents on the nitrogen atom have oxygen atoms in the second to fifth positions of the aliphatic chain, much longer aliphatic chains may be used without loss of herbicidal properties. Furthermore, cyclic radicals such as phenyl, cyclohexyl, furfuryl and piperidyl may be present in the aliphatic chain beyond the said oxygen atoms. The presence of the oxygen atom will in many cases improve the herbicidal properties of the shorter chain aliphatic substituted alpha-haloacetamides.

In accordance with this invention the new and useful compounds are defined generically by the following structural formula:

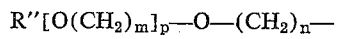

wherein Y is a halogen of the class consisting of chlorine and bromine; wherein R is a radical of the class structure $$R''[O(CH_2)_m]_p\text{—}O\text{—}(CH_2)_n\text{—}$$

wherein $m$ and $n$ are each integers from one to four; wherein $p$ is an integer from zero to three; and wherein R" is a radical of the group consisting of aliphatic hydrocarbon radicals of up to ten carbon atoms, hydrogen, chlorine substituted aliphatic radicals having up to ten atoms, benzyl, furfuryl, thenyl, tetrahydrofurfuryl, tetrahydrothenyl, dihydrofurfuryl, dihydrothenyl, cyclohexenylmethyl and cyclohexylmethyl; and wherein R' is a radical selected from the group consisting of hydrogen, aliphatic hydrocarbon radicals having up to ten carbon atoms, chlorine substituted aliphatic hydrocarbon radicals, benzyl, furfuryl, thenyl, dihydrothenyl, dihydrofurfuryl, tetrahydrofurfuryl, tetrahydrothenyl, cyclohexylmethyl, cyclohexenylmethyl and radicals of the structure $$R''[O(CH_2)_m]_p\text{—}O\text{—}(CH_2)_n\text{—}$$

wherein R", $p$, $m$ and $n$ are as above defined.

Compounds of this type may be prepared by the interreaction of a haloacetyl chloride and an amine having the desired substituents by contacting them in the presence of an alkali metal hydroxide. The reaction is effected by gradually mixing the reactants at a rate which permits the maintenance of the reaction temperature at a pre-selected subzero temperature. The low temperature can be maintained by a path of carbon dioxide acetone, refrigeration brine or other freezing mixtures. At the completion of the reaction the desired product may be separated by fractional distillation or by recrystallization from a suitable organic solvent. Further details of the method of the preparation are set forth with respect to specific examples hereinafter set forth.

One specific type of compound useful in the practice of this invention is that corresponding to the following structural formula

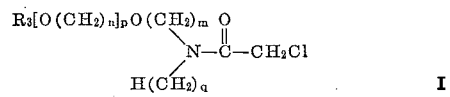
                                  I wherein $n$ and $m$ are each integers from one (1) to four (4), $p$ is an integer from zero (0) to three (3) and $R_3$ is an aliphatic hydrocarbon radical having up to ten carbon atoms, and wherein $q$ is an integer from zero (0) to ten (10).

Useful compounds of this type are:

alpha-chloro-N-methoxyethyl acetamide
alpha-chloro-N-4-ethoxybutyl acetamide
alpha-chloro-N-methoxyethoxyethoxyethyl acetamide
alpha-chloro-N-allyl-N-3-ethoxypropyl acetamide
alpha-chloro-N-3-decyloxypropyl acetamide
alpha-chloro-N-ethyl-N-3-nonyloxypropyl acetamide Another type is the compound of the structural formula

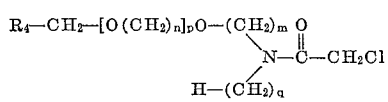

wherein $R_4$ is a six member hydrocarbon ring; wherein $m$ and $n$ are integers from one to four; wherein $p$ is an integer from zero to three; and wherein $q$ is an integer from zero to ten.

Useful herbicidal compounds of this class are:

alpha-chloro-N-3-benzyloxypropyl acetamide
alpha - choloro - N - allyl - N - 3 - cyclohexylmethoxypropyl acetamide
alpha-chloro-N-2-cyclohexenylmethyloxyethyl acetamide
alpha-chloro-N-4-benzyloxybutyl acetamide alpha - chloro - N - 2 - ethylhexyl - N - 2 - benzyloxyethyl acetamide The useful herbicides may also be of the structure:

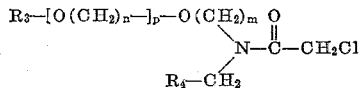

wherein $R_4$ is a six member hydrocarbon ring; wherein $m$ and $n$ are integers from one to four; wherein $p$ is an integer from zero to three and wherein $R_3$ is an aliphatic hydrocarbon radical of up to ten carbon atoms.

The following compounds are typical of this class of herbicides:

alpha-chloro-N-benzyl-N-3-methoxypropyl acetamide
alpha - chloro - N - cyclohexylmethyl - N - nonyloxypropyl acetamide
alpha - chloro - N - cyclohexenylmethyl - N - 2 - ethoxyethyl acetamide
alpha-chloro-N-benzyl-N-3-allyloxypropyl acetamide
alpha-chloro-N-benzyl-N-methoxyethoxyethyl acetamide The herbicide may also be of the structure:

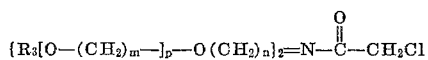

wherein $R_3$ is an aliphatic hydrocarbon radical of up to ten carbon atoms; wherein $m$ and $n$ are integers from one to four; and wherein $p$ is an integer from zero to three.

Compounds typical of this structure are:

alpha-choloro-N,N-di(3-allyloxypropyl) acetamide
alpha-chloro-N,N-di(decyloxyethyl) acetamide
alpha-chloro-N,N-di(methoxyethoxyethyl) acetamide
alpha-chloro-N,N-di(3-isobutoxypropyl) acetamide Another type of structure useful in the practice of the described herbicidal method is

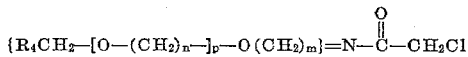

wherein $R_4$ is a hydrocarbon ring; wherein $m$ and $n$ are integers from one to four; and wherein $p$ is an integer from zero to three.

Compounds of this structure are:

alpha-chloro-N,N-di(3-benzyloxypropyl) acetamide
alpha - chloro - N,N - di(3 - benzyloxymethyloxypropyl) acetamide
alpha - chloro - N,N - di(2 - cyclohexylmethoxyethyl) acetamide
alpha - chloro - N,N - di(3 - cyclohexenylmethoxypropyl) acetamide Further details of the preparations are set forth in the following specific examples:

*Example 1*

A 1,000 ml. reaction flask is charged with 26.7 g. of 3-methoxypropyl amine, 72 g. of 20% sodium hydroxide solution and 125 ml. of 1,2-dichloroethane. The flask and its contents are cooled to —10° C. and 40.8 g. of chloroacetyl chloride are gradually added over a period of 70 minutes, during which time the temperature is maintained at approximately —10° C. by means of a bath of carbon dioxide-acetone mixture. After the combination of reagents is completed, the mixture is permitted to warm to about 10° C., at which time the reaction mixture separates into two liquid phases. The organic layer is separated, washed with water, with dilute sodium bicarbonate solution, with dilute hydrochloric acid and with water. After drying over magnesium sulfate, the solvent is evaporated at reduced pressure. The resulting composition is distilled at 88° C. and 0.5 mm. total pressure. A 71% yield of a compound identified as alpha-chloro-N-(3-methoxypropyl) acetamide is recovered. The compound is a liquid as recovered, but it solidifies upon standing, the melting point being about 30° C.

*Example 2*

Using the procedure described in the preceding example, 35.1 g. of 3-isopropoxypropyl amine and 40.7 g. of chloroacetyl chloride are combined in the presence of 72 g. of 20% sodium hydroxide and 150 ml. of 1,2-dichloroethane. A product is removed by vacuum distillation having a boiling point of 90° C. at 0.5 mm. and identified as alpha - chloro - N - (isopropoxypropyl) acetamide.

*Example 3*

Using the procedure of Example 1, 19.5 g. of butoxypropyl amine and 17 g. of chloroacetyl chloride are reacted in the presence of 30 g. of 20% sodium hydroxide and 100 ml. of 1,2-dichloroethane. The resulting compound, the alpha-chloro-N-(butoxypropyl) acetamide is recovered having a boiling point of 120 to 121° C. at 1.5 mm.

*Example 4*

By substituting 3-(2-ethyl hexyloxy)propyl amine in place of 3-butoxy propyl amine of the preceding example, a compound boiling at 140 to 142° C. at 0.8 mm. total pressure is recovered and identified as alpha-chloro-N-3-(2-ethyl hexyloxy)propyl acetamide.

*Example 5*

A sample of 3-nonyloxy propyl amine is prepared by the hydrogenation of nonyloxypropionitrile and is charged to the extent of 60 g. in a 1,000 ml. reaction flask and mixed with 34 g. of chloroacetyl chloride, 60 g. of sodium hydroxide solution and 100 ml. of 1,2-dichloroethane. A substantial yield of product is recovered by fractionizing the mixture at 1 mm. total pressure and separating the fraction that boiled between 138 to 139° C. The compound was identified as alpha-chloro-N-(3-nonyloxypropyl) amine.

*Example 6*

The method of the preceding example is repeated except that 3-decyloxypropyl amine is used in place of the 3-nonyloxypropyl amine. The fractional distillation of the product at 0.8 mm. and boiling at 163 to 164° C. resulted in the formation of the desired substituted acetamide.

*Example 7*

A mixed alkoxypropyl amine is prepared by the condensation of a mixed fatty acid alcohol with acrylonitrile followed by hydrogenation. Thirty grams of this mixed amine is charged with 10.8 g. of chloroacetyl, 19 g. of 20% sodium hydroxide solution and 100 ml. of 1,2-dichloroethane. A substantial yield of product is recovered from the reaction mixture by crystallization and recrystallized from ethyl acetate. It was found to have a boiling point between 63 and 65° C.

*Example 8*

By the use of a procedure identical to Example 1 except for the substitution of 2-methoxyethyl amine for the methoxypropyl amine, a compound is produced which is identified as alpha-chloro methoxyethyl acetamide.

*Example 9*

A reaction flask is charged with 1.3 g. of di(2-methoxyethyl) amine, 4 g. of sodium hydroxide in 16 g. of water and sufficient chloroform to produce a fluid reaction mixture. The reaction is maintained at —10 to —20° C. during which time 11.3 g. of chloroacetyl chloride is gradually added thereto. A 93% yield of a compound having a boiling point of 117 to 118° C. at 1 mm. total pressure is identified as alpha-chloro-N,N-di-(2-methoxyethyl) acetamide.

*Example 10*

A reaction flask is charged with 17.7 g. of an amine identified as 3[2-(2-methoxyethoxy)] propyl amine and 19.9 cc. of 5.91 normal sodium hydroxide in chloroform solution. Chloroacetyl chloride, to the extent of 11.3 g., is gradually added to the reaction mixture while maintaining the temperature at about 0° C. When the reaction is completed, it is separated by distillation at 0.5 to 1.0 mm. The fraction boiling at 172° C. is separated. It is identified as the compound having the structure $$CH_3-O-CH_2-CH_2-O-CH_2CH_2O-CH_2CH_2CH_2-NH-\overset{O}{\underset{\|}{C}}-CH_2-Cl$$

Example 11

The procedure analogous to those set forth in Examples 1 through 14, chloroacetylchloride is reacted with a substantially equal molar proportion of benzoxy propyl benzyl amine and the resulting compound having an index of refraction of 1.4978 was separated from the reaction mixture. This compound is identified as alpha-chloro-N-benzyl-N-benzoxy propyl acetamide.

Example 12

The procedure of the preceding example is repeated except that the amine used was benzoxy propyl amine. A compound with a boiling point of 133° C. at 0.15 mm. pressure is identified as alpha-chloro-N-3-benzoxy-propyl acetamide.

Example 13

A reaction flask is charged with 10 parts by weight of 3-cyclohexenylmethoxy propyl amine, 2.6 parts by weight of sodium hydroxide and approximately 100 parts of chloroform. After cooling the reaction flask to less than −10° C., 7.5 parts by weight of chloroacetylchloride is gradually introduced. The reaction mixture is allowed to warm to room temperature and the organic layer is separated. After removing the chloroform on a steambath, the residue is distilled at 0.15 mm. pressure and 133° C. A yield of 94.5% of alpha-chloro-cyclohexenylmethoxy propyl acetamide was recovered and found to have an index of refraction of 1.4871.

Example 14

The process of the preceding experiment is repeated using N-3-cyclohexenylmethoxy propyl-N-tetra-hydro furfuryl amine in place of the 3-cyclohexenylmethoxy propyl amine. The product recovered an 85% yield at 186° C. and 0.25 mm. pressure is identified as alpha-chloro-N-3-cyclohexenylmethoxy propyl-N-tetra-hydro furfuryl acetamide.

Example 15

N-furfuryl-oxyethyl amine is charged to the reaction flask containing aqueous sodium hydroxide and a chloroform reaction medium. After cooling to −10° C. an equal mole of proportion of chloroacetylchloride is gradually added so as to maintain the temperatures below 0° C. When the addition is completed, the reaction mixture is permitted to warm to room temperature. The two liquid phases thereby formed are separated and the ether evaporated from the organic phase. The residue is distilled at reduced pressures and the product recovered identified as alpha-chloro-N-2-furfuryl-oxyethyl acetamide.

Example 16

Using the procedure described in the previous example except that 3-tetra-hydro-furyl-ethoxy-propyl-ethyl amine was used in place of the furfuryl-oxyethyl amine, the compound thereby formed is alpha-chloro-N-tetra-hydro-furyl-ethoxy-propyl-N-ethyl acetamide.

The relative value of the above described chloro-acetamides and other haloacetamides prepared by analogous methods was determined by planting a large number of seeds of each of several different botanical types and treating the flats with varying concentrations of each of the haloacetamides described. The observed data is set forth in the following table wherein the botanical type is identified by an initial in accordance with the following code:

A _____ wild oat.
B _____ Broom grass.
C _____ rye grass (DOM).
D _____ foxtail.
E _____ barnyard grass.
F _____ crabgrass.
G _____ cheat grass.
H _____ buckwheat.
I _____ mustard (radish).
J _____ cotton.
K _____ corn.
L _____ field bindweed.
M _____ wild morning glory.
N _____ cucumber.
O _____ portulaca.

The following table of numerals will be used to designate the relative herbicidal effect of the various haloacetamides:

0 _____ No phytotoxicity.
1 _____ Slight phytotoxicity.
2 _____ Moderate phytotoxicity.
3 _____ Severe phytotoxicity.

The following herbicidal data was observed:

| | Rate | A | B | C | D | E | F | G | H | I | J | K | L | M | N | O |
|---|---|---|---|---|---|---|---|---|---|---|---|---|---|---|---|---|
| N-3(n-butyloxy) propyl alpha-bromo acetamide | 25 | 3 | 3 | 3 | 3 | 3 | 3 | ---- | 1 | 1 | 2 | 0 | 1 | 1 | ---- | ---- |
| | 5 | 3 | 3 | 3 | 3 | 3 | 3 | ---- | 0 | 0 | 0 | 0 | 3 | 0 | ---- | ---- |
| | 1 | 2 | 0 | 1 | 1 | 3 | 1 | ---- | 2 | 0 | 1 | 0 | 0 | 0 | ---- | ---- |
| N-3(butoxy)propyl N-decyl alpha-chloro-acetamide | 25 | 0 | 1 | 0 | 2 | 3 | 3 | ---- | 0 | 0 | 0 | 0 | 0 | 0 | ---- | ---- |
| | 5 | 0 | 1 | 0 | 1 | 1 | 1 | ---- | 0 | 0 | 0 | 0 | 0 | 0 | ---- | ---- |
| | 1 | 0 | 0 | 0 | 0 | 0 | 0 | ---- | 0 | 0 | 0 | 0 | 0 | 0 | ---- | ---- |
| N,N-di(propoxypropyl) alpha-chloro-acetamide | 25 | 3 | 3 | 3 | 3 | 3 | 3 | ---- | 0 | 0 | 1 | 0 | 0 | 0 | ---- | ---- |
| | 10 | 3 | 2 | 2 | 3 | 3 | 3 | ---- | 0 | 0 | 0 | 0 | 0 | 0 | ---- | ---- |
| | 5 | 3 | 1 | 2 | 3 | 3 | 3 | ---- | 0 | 0 | 0 | 0 | 1 | 0 | ---- | ---- |
| | 1 | 0 | 0 | 0 | 3 | 3 | 3 | ---- | 0 | 1 | 0 | 0 | 0 | 0 | ---- | ---- |
| N-3(cyclohexylmethoxy)propyl alpha-chloroacetamide. | 25 | 3 | 3 | 3 | 3 | 3 | 3 | ---- | 1 | 1 | 2 | 3 | 0 | 1 | ---- | ---- |
| | 5 | 3 | 3 | 3 | 3 | 3 | 3 | ---- | 2 | 0 | 0 | 3 | 0 | 0 | ---- | ---- |
| | 1 | 2 | 2 | 3 | 3 | 3 | 2 | ---- | 2 | 0 | 2 | 0 | 0 | 0 | ---- | ---- |
| N-3(n-butoxy)propyl N-tetrahydofurfuryl alpha-chloro acetamide. | 25 | 3 | 3 | 2 | 3 | 3 | 3 | ---- | 0 | 0 | 0 | 0 | 0 | 0 | ---- | ---- |
| | 5 | 2 | 2 | 1 | 3 | 3 | 3 | ---- | 0 | 0 | 0 | 0 | 0 | 0 | ---- | ---- |
| | 1 | 0 | 0 | 0 | 1 | 2 | 2 | ---- | 0 | 0 | 0 | 0 | 0 | 0 | ---- | ---- |
| N-cyclohexylmethyl N-3(cyclohexylmethoxy)propyl alpha-chloroacetamide. | 25 | 2 | 2 | 3 | 3 | 3 | 3 | ---- | 0 | 0 | 0 | 0 | 0 | 0 | ---- | ---- |
| | 5 | 0 | 0 | 0 | 0 | 2 | 2 | ---- | 0 | 0 | 0 | 0 | 0 | 0 | ---- | ---- |
| | 1 | 0 | 0 | 0 | 0 | 0 | 0 | ---- | 0 | 0 | 0 | 0 | 0 | 0 | ---- | ---- |
| N-3(isopropoxy) propyl alpha-chloro acetamide | 25 | 3 | ---- | 3 | ---- | ---- | ---- | 3 | 1 | 2 | 0 | ---- | ---- | ---- | 1 | ---- |
| | 5 | 3 | 3 | 3 | 3 | 3 | 3 | 3 | 0 | 2 | 1 | 0 | 2 | 0 | 1 | ---- |
| | 2½ | 1 | 2 | 2 | 3 | 3 | 2 | ---- | 0 | 2 | 1 | 0 | 2 | 2 | ---- | ---- |
| | 1 | 1 | 3 | 0 | 3 | 2 | 3 | ---- | 2 | 3 | 1 | 0 | 1 | 1 | ---- | ---- |
| N-3(allyloxyethoxy)propyl alpha-chloroacetamide | 25 | 2 | 2 | 3 | 3 | 3 | 3 | ---- | 1 | 0 | 2 | 1 | 0 | 0 | ---- | ---- |
| | 10 | 3 | 2 | 3 | 3 | ---- | 3 | ---- | 0 | 0 | 0 | 0 | 0 | 0 | ---- | ---- |
| | 5 | 3 | 3 | 3 | 3 | 3 | ---- | ---- | 0 | 0 | 2 | 0 | 0 | 0 | ---- | ---- |
| | 1 | 1 | 1 | 1 | 2 | 3 | ---- | ---- | 0 | 0 | 0 | 0 | 0 | 0 | ---- | ---- |
| | ½ | 0 | 0 | 0 | 0 | ---- | 2 | ---- | 0 | 0 | 0 | 0 | 0 | 0 | ---- | ---- |
| N-3-methoxypropyl alpha-chloro-acetamide | 25 | 3 | ---- | 3 | ---- | ---- | ---- | 3 | 1 | 3 | 0 | ---- | ---- | ---- | 1 | ---- |
| | 5 | 3 | ---- | 3 | ---- | ---- | ---- | 3 | 0 | 0 | 0 | ---- | ---- | ---- | 0 | ---- |
| | 2½ | 1 | ---- | 3 | ---- | ---- | ---- | 0 | 0 | 0 | 0 | ---- | ---- | ---- | 0 | ---- |

| | Rate | A | B | C | D | E | F | G | H | I | J | K | L | M | N | O |
|---|---|---|---|---|---|---|---|---|---|---|---|---|---|---|---|---|
| N-3(n-propoxy)-propyl alpha-chloro-acetamide | 25 | 3 | 3 | 3 | 3 | 2 | 3 | | | 0 | 0 | 2 | 0 | 3 | | |
| | 5 | 3 | 3 | 1 | 3 | 2 | 3 | | | 0 | 0 | 0 | 0 | 0 | | |
| | 1 | 1 | 2 | 0 | 3 | 3 | 3 | | | 1 | 1 | 0 | 1 | 1 | | |
| N-3-isopropoxypropyl alpha-chloro acetamide | 25 | 3 | 3 | 3 | 3 | | | | 1 | 1 | 0 | 3 | | | | |
| | 10 | 3 | 3 | 3 | 3 | | | | 2 | 0 | 0 | 3 | | | 2 | |
| | 5 | 3 | 3 | 3 | 3 | | | | 2 | 0 | 1 | 1 | | | 3 | |
| | 2½ | 2 | 0 | 3 | 3 | | | | 0 | 0 | 0 | 0 | | | 0 | |
| | 1 | 0 | 0 | 2 | 0 | | | | 0 | 0 | 0 | 0 | | | 0 | |
| N-3-isobutoxypropyl alpha-chloro acetamide | 25 | 3 | 3 | 3 | 3 | 3 | 3 | | | 0 | 0 | 3 | 0 | 1 | | |
| | 5 | 3 | 1 | 1 | 3 | 3 | 3 | | | 1 | 0 | 0 | 0 | 2 | | |
| | 1 | 0 | 0 | 0 | 0 | 0 | 0 | | | 0 | 0 | 0 | 0 | 0 | | |
| N-3-Sec butyloxypropyl alpha-chloro acetamide | 25 | 3 | 3 | 3 | 3 | 3 | 3 | | | 1 | 0 | 3 | 0 | 1 | | |
| | 5 | 3 | 2 | 3 | 3 | 0 | 3 | | | 0 | 0 | 0 | 0 | 0 | | |
| | 1 | 0 | 1 | 0 | 0 | 2 | 2 | | | 0 | 0 | 0 | 0 | 2 | | |
| N-3-tertiary isobutyloxypropyl alpha chloro acetamide | 25 | 3 | 3 | 3 | 3 | 3 | 3 | | | 1 | 0 | 1 | 0 | 0 | | |
| | 5 | 1 | 3 | 3 | 3 | 2 | 3 | | | 1 | 0 | 0 | 0 | 1 | | |
| | 1 | 0 | 0 | 0 | 0 | 0 | 0 | | | 0 | 0 | 0 | 0 | 0 | | |
| N-3-allyloxy propyl alpha-chloro acetamide | 25 | 3 | 3 | 3 | 3 | 3 | 3 | | 2 | 1 | 1 | 3 | 2 | 2 | | |
| | 5 | 3 | 3 | 3 | 3 | | 3 | | 1 | 1 | 0 | 1 | 0 | 0 | | |
| | 1 | 2 | 1 | 2 | 2 | | 2 | | 0 | | 0 | 0 | 0 | 0 | | |
| N-3-n-octyloxy propyl alpha-chloro acetamide | 25 | 3 | 3 | 3 | 3 | | | | 1 | 2 | 0 | 0 | | | 0 | |
| | 10 | 0 | 2 | 3 | 3 | | | | 0 | 0 | 0 | 0 | | | 1 | |
| | 5 | 1 | 3 | 3 | 3 | | | | 0 | 0 | 0 | 2 | | | 1 | |
| | 2½ | 0 | 0 | 0 | 0 | | | | 0 | 0 | 0 | 0 | | | 0 | |
| | 1 | 0 | 0 | 0 | 0 | | | | 0 | 0 | 0 | 0 | | | 0 | |
| N-3-nonyloxypropyl alpha chloro acetamide | 25 | 2 | 3 | 3 | 3 | | | | 0 | 0 | 0 | 0 | | | 0 | |
| | 10 | 2 | 3 | 3 | 2 | | | | 2 | 0 | 1 | 0 | | | 2 | |
| | 5 | 1 | 3 | 3 | 2 | | | | 1 | 1 | 0 | 0 | | | 1 | |
| | 2½ | 0 | 2 | 2 | 2 | | | | 0 | 0 | 0 | 0 | | | 0 | |
| | 1 | 0 | 3 | 1 | 0 | | | | 0 | 0 | 0 | 0 | | | 0 | |
| N-3-methoxy-ethoxyethoxypropyl alpha-chloro acetamide | 25 | 3 | 3 | 3 | 3 | | | | 0 | 0 | 0 | 1 | | | 0 | |
| | 5 | 2 | 2 | 1 | 3 | | | | 0 | 1 | 1 | 0 | | | 2 | |
| | 1 | 1 | 0 | 0 | 2 | | | | 1 | 0 | 0 | 0 | | | 2 | |
| N-3-ethoxy-ethoxy ethoxy propyl alpha-chloro acetamide | 25 | 3 | 3 | 3 | 3 | | | | 0 | 0 | 1 | 1 | | | 3 | |
| | 5 | 0 | 1 | 0 | 3 | | | | 0 | 0 | 0 | 1 | | | 0 | |
| | 1 | 0 | 1 | 1 | 0 | | | | 0 | 0 | 0 | 0 | | | 0 | |
| N-methoxyethyl alpha-chloro acetamide | 25 | 3 | 3 | 3 | 3 | | | | 0 | 3 | 0 | 3 | | | 1 | |
| | 5 | 3 | 3 | 3 | 3 | | | | 0 | 0 | 2 | 0 | | | 2 | |
| | 1 | 2 | 2 | 2 | 3 | | | | 0 | 0 | 0 | 0 | | | 0 | |
| | ½ | 2 | 3 | 3 | 3 | | | | 0 | 1 | 0 | 0 | | | 0 | |
| N,N-di(methoxy ethyl) alpha-chloro acetamide | 25 | 3 | 3 | 3 | 3 | | | 1 | 0 | 1 | 0 | 0 | | 3 | 1 | |
| | 5 | 3 | 3 | 3 | 3 | | | 3 | 0 | 0 | 3 | 0 | | 3 | 3 | |
| | 1 | 3 | 3 | 3 | 3 | | | 0 | 0 | 0 | 3 | 0 | | 2 | 0 | |
| | ½ | 1 | 2 | 3 | 3 | | | 0 | 1 | 0 | 0 | 0 | | 0 | 0 | |
| | ½ | 0 | 1 | 2 | 3 | | | 0 | 0 | 0 | 1 | 0 | | 1 | 2 | |
| | ½ | 0 | 2 | 2 | 0 | | | 0 | 0 | 0 | 0 | 0 | | 0 | 0 | |
| N-benzoxyethyl alpha-chloro acetamide | 25 | 3 | 3 | 3 | 3 | 3 | 3 | | | 1 | 0 | 3 | 0 | 0 | | |
| | 5 | 3 | 3 | 3 | 3 | 3 | 3 | | | 1 | 2 | 1 | 0 | 0 | | |
| | 2½ | 3 | 3 | 3 | 3 | 3 | 3 | | | 0 | 0 | 0 | 0 | 3 | | |
| | 1 | 3 | 3 | 2 | 3 | 2 | 3 | | | 1 | 0 | 0 | 1 | 3 | | |
| N-trichlorobenzoxy ethyl alpha-chloro acetamide | 25 | 0 | 3 | 2 | 3 | 3 | 3 | | 1 | 1 | 1 | 0 | 1 | 2 | | |
| | 5 | 0 | 3 | 1 | 3 | 2 | 2 | | 0 | 2 | 0 | 0 | 2 | 1 | | |
| | 1 | 0 | 2 | 1 | 3 | 0 | 1 | | 0 | 1 | 1 | 0 | 0 | 0 | | |
| | 25 | 3 | 3 | 3 | 3 | 3 | 3 | | 2 | 2 | 0 | 0 | 2 | 3 | | |
| | 5 | 3 | 1 | 3 | 3 | 3 | 3 | | 0 | 2 | 1 | 0 | 2 | 2 | | |
| | 1 | 0 | 3 | 0 | 3 | 2 | 3 | | 3 | 3 | 3 | 0 | 3 | 1 | | |
| N-3(methoxyethoxy) propyl alpha-chloro acetamide | 25 | 3 | 0 | 2 | 3 | 3 | 3 | | 0 | 1 | 0 | 2 | 1 | 0 | | |
| | 10 | 3 | 3 | 3 | 3 | 3 | 3 | | 0 | 2 | 1 | 2 | 1 | 1 | | |
| | 5 | 3 | 3 | 3 | 3 | 3 | 3 | | 1 | 2 | 2 | 1 | 0 | 1 | | |
| | 3 | 3 | 3 | 3 | 3 | 3 | 3 | | 2 | 2 | 2 | 1 | 1 | 1 | | |
| | 1 | 2 | 2 | 2 | 3 | 0 | 3 | 2 | | 0 | 0 | 0 | 0 | 0 | | |

For the purpose of demonstrating the utility of the new compositions as herbicides several homologues which did not contain the oxa and thia atoms in the nitrogen substituents were studied by the identical tests and the following data was obtained at 25 lbs. per acre.

| | Rate, Lb./Acre | Average Grass | Herbicidal Val. Broadleaf |
|---|---|---|---|
| Alpha-chloro acetamide | 10 | 0 | 1 |
| N,N-dimethyl acetamide | 25 | 1 | 2 |
| N,N-dimethyl alpha chloro acetamide | 5 | [1] 3+ | 1 |
| N-2-phenethyl alpha chloro acetamide | 5 | 0 | 0 |
| N,N-dibenzyl alpha chloro acetamide | 25 | 0 | 0 |
| N-tetra decyl alpha chloro acetamide | 25 | 1 | 1 |
| N-p-methoxy phenyl alpha chloro acetamide | 50 | 0 | 0 |
| N,N-dicyclohexyl alpha chloro acetamide | 25 | 0 | 0 |
| N,N-di(2-ethylhexyl) alpha chloro acetamide | 25 | 1 | 1 |

[1] All dead.

The herbicidal activities measured by the above described experiments demonstrate the effect of the aliphatic hetero atoms, oxygen or sulfur, in promoting the activity of long chain substituted alpha-haloacetamides, which otherwise are not herbicidal. The presence of the oxa or thia group will also improve the activity of the alpha-haloacetamides with short chain substituents on the amide nitrogen.

The herbicidal effects are usually noticeable at low levels of application where pronounced grass specificity is observed, in many instances at less than one pound per acre. The optimum level of application for many compounds is 5 to 15 pounds and a few up to 25 pounds. In general the higher applications produce a more universal herbicidal effect. For most compounds there is a progressively increasing activity as the level of application is increased and at some point grass specific action will be observed. Occasionally, some genera of the grasses will manifest substantial resistance to a particular compound; and conversely some broadleaf plants may be sensitive to a particular alpha-haloacetamide. However, all of the new compounds have useful herbicidal properties.

Selective herbicidal activity with respect to several genera of grasses is illustrated by the data in the above tables. Other experiments run with respect to plants of different genera, which have different metabolisms and physical characteristics indicate little or no inhibition of growth. The seven botanical types, or genera, of grasses which are effectively controlled by means of the alpha-haloacetamides of this invention, embrace a large number of undesirable plants, or weeds, frequently found in vegetable crops. This invention is not limited to removing grasses from broadleaf plants, since the selective activity will be useful in removing weeds from corn, which belongs to a different genus of grass. Many other crops and particularly the broad leaved plants are inhibited by weeds of the grass genera, which can be effectively controlled by the practice of this invention. In some instances there are minor herbicidal effects on dicotyledonous plants, and therefore optimum results may depend to some extent on experience with respect to the activity of the particular N-substituted alpha-haloacetamide on the vegetable crop to be treated.

The pre-emergent inhibition of weeds may take place when the seedling, after germination, passes through treated soil. When the phytotoxic compound is deposited on the surface, the seedling will be inhibited as it emerges from the soil. If the phytotoxic compound is mixed with the surface layers of soil, the inhibition of the unwanted plant may take place before emergence from the ground and in many instances at or near the time of germination.

As demonstrated above, unusual grass specificity can be achieved at lower levels of application, whereas at higher levels of application the N-substituted alpha-haloacetamides exhibit a more general herbicidal effect. This provides another and quite different utility in the removal of plants of a large number or all botanical genera. It will be apparent that quite different effects can be obtained by modifying the method of use. For this reason an essential part of this invention is the formulation so as to permit a uniform predetermined application of herbicide to the plant environment, for example to leaves or soil surfaces, so as to produce the desired effect. By the proper selection and proportioning of the various conditioning agents either liquid or solid formulations can be prepared, and so as to adapt the herbicide for achieving the desired result with any conventional device for treating plant or soil surfaces.

The solid formulations, frequently referred to as "dusts" may contain in addition to the active ingredient, diluents or extenders, dispersing agents to prevent local high concentrations, and agents to facilitate distribution in solid or soil waters. Suitable solid diluents are those which render the compositions permanently dry and free flowing. Thus hydroscopic materials are to be avoided unless the compositions also contain a separate substance to serve as an aid to the flowability. Effective solid diluents, preferably pulverulent or granular in form so as to be effective carriers for the active ingredient, are the natural clays, such as china clays, the bentonites and the attapulgites; other minerals in natural state, such as talc, pyrophylite, quartz, diatomaceous earth, fuller's earth, chalk, rock phosphate and sulfur; and the chemically modified minerals, such as the acid washed bentonite, precipitated calcium phosphate, precipitated calcium carbonate, and colloidal silica. These diluents may represent a substantial portion, for example 50 to 98 percent by weight of the entire formulation as applied to plant or soil. More concentrated herbicides will require dilution by the user in order to properly condition the soil for the most effective usage. The concentrated solid herbicidal formulations can be used with less danger if they are mixed with the surface soil by means of a disk-plow or harrow at the time of application.

The liquid compositions for herbicidal use may be solutions, or other liquid dispersions. The choice of a liquid medium will depend to some extent upon the physical properties of the active ingredient. The N-substituted alpha-haloacetamides may be water-soluble and mere dissolution will then provide a usable formulation. Often the N-substituted alpha-haloacetamides are only limitedly soluble in water and therefore aqueous formulations will necessarily be dispersions of minute drops of the water-insoluble substances in suspension in an aqueous medium. The known water-insoluble substituted alpha-haloacetamides of this invention may first be dissolved in a suitable organic solvent and the organic solution of the active ingredient then incorporated in water or in any aqueous medium to produce a heterogenous dispersion of the active ingredient in water.

One composition which aids in the effectivity of the herbicidal component is a surface active agent which serves in providing uniform dispersions of all formulation components of both solid and liquid types, and may be anionic, cationic or non-ionic types and includes conventional soaps, such as the water-soluble salts of long chain carboxylic acids, the amino soaps such as the amine salts of long chain carboxylic acids, the sulfonated animal, vegetable and mineral oils, quaternary salts of high molecular weight acids, rosin soaps such as salts of abietic acid, sulfuric acid salts of high molecular weight organic compounds, algin soaps, ethylene oxide condensated with fatty acid, alkyl phenols and mercaptans, and other simple and polymeric compositions having both hydrophilic and hydrophobic functions so as to enable the mixing of otherwise immiscible ingredients. Generally, the surface active agents will be only a minor portion of the formulation as used, for example less than 10 percent and frequently as low as 0.05 percent. In general, concentrations of from 0.5 to 5 percent are found to be optimum.

Many of the formulations are benefited by the incorporation of organic solvents for the active components, such as the organic alcohols, ketones and hydrocarbons, for example isopropanol, benzene, acetone, methylethyl ketone, kerosene, and chlorinated hydrocarbons. The proportions of such organic liquid additives will depend upon the solubility properties of the active ingredient and may require as little as 1 percent or as much as 20 percent in order to provide a uniformly distributed formulation which is capable of maintaining its distributed state during storage, use and after application to the soil or plant surfaces.

A useful formulation of the herbicidal compositions may involve the solid or liquid concentrate of the active ingredient to which has been added formulation aids or conditioning agents so that the concentrates may be mixed with a suitable extender or diluent in the field at the time of use. Obviously, for this purpose the dispersing agents will be present in larger concentrations so that upon dilution with water or a solid extender, compositions containing optimum proportions of dispersing agents and active component will be prepared. The solid or liquid formulations are preferably applied by mechanical equipment involving spraying or spreading the formulation on soil or plant surfaces being treated. For this purpose readily flowable compositions are required, either liquid or solid in physical state. Thus a critical aspect of the invention is the fluent carrier without which the optimum herbicidal effects cannot be achieved.

Both the solid and the liquid formulations above described are useful in the application of herbicides because they facilitate the uniform distribution and aid in the destruction of undesirable plants by maintaining the active ingredient in a form which enables the prompt assimilation by the plant and the efficient utilization of its weed destroying properties. The described "conditioning agents" enable the proper use to achieve the desired herbicidal effects by an unskilled operator without elaborate equipment.

In addition to the above described herbicide conditioning agents other adjuvants may be added, such as insecticides, fungicides, nematocides and other herbicides. By the use of the subject compounds at the low grass specific levels of application, substantial benefits can be obtained by the addition thereto of a broad leaf specific herbicide. In this manner, formulations of efficient and effective use can be provided.

What is claimed is:

1. The method of inhibiting pre-emergent growth of unwanted vegetation which comprises treating the growing medium with a phytotoxic amount of N-ethyl-N-isopropoxypropyl alpha-chloroacetamide.

2. The method of inhibiting pre-emergent growth of unwanted vegetation which comprises treating the growing medium with a phytotoxic amount of N-benzyloxypropyl-N-ethyl alpha-chloroacetamide.

3. The method of inhibiting pre-emergent growth of unwanted vegetation which comprises treating the growing medium with a phytotoxic amount of N,N-di(propoxyethyl) alpha-chloroacetamide.

4. The method of inhibiting pre-emergent growth of unwanted vegetation which comprises treating the growing medium with a phytotoxic amount of N-cyclohexylmethoxyethyl alpha-chloroacetamide.

5. The method of inhibiting pre-emergent growth of unwanted vegetation which comprises treating the growing medium with a phytotoxic amount of N-3(ethoxypropyl) alpha-chloroacetamide.

6. The method of inhibiting pre-emergent growth of unwanted vegetation which comprises treating the growing medium with a phytotoxic amount of a compound of the formula

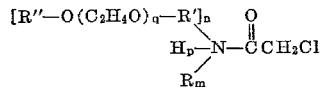

wherein R is selected from the class consisting of benzyl, furfuryl, alkyl having up to eight carbon atoms, cyclohexylmethyl and allyl; wherein R' is a divalent alkylene radical of from two to four carbon atoms; wherein R'' is selected from the class consisting of benzyl, cyclohexylmethyl, cyclohexenylmethyl, allyl, furfuryl, tetrahydrofurfuryl and alkyl having up to ten carbon atoms; wherein $n$ is an integer from one to two; wherein $p$ is an integer from zero to one; wherein $m$ is an integer from zero to one; wherein $q$ is an integer from zero to two; and wherein the sum of $m$, $n$ and $p$ is always two.

7. The method of inhibiting pre-emergent growth of unwanted vegetation which comprises treating the growing medium with a phytotoxic amount of N-3(alkoxypropyl)-alpha-chloroacetamide wherein the alkoxy moiety has up to ten carbon atoms.

8. The method of inhibiting pre-emergent growth of unwanted vegetation which comprises treating the growing medium with a phytotoxic amount of N,N-di(alkoxypropyl)-alpha-chloroacetamide wherein the alkoxy moiety has up to ten carbon atoms.

9. The method of inhibiting pre-emergent growth of unwanted vegetation which comprises treating the growing medium with a phytotoxic amount of N-alkyl-N-alkoxypropyl-alpha-chloroacetamide wherein the alkyl moiety has up to eight carbon atoms and the alkoxy moiety has up to ten carbon atoms.

10. The method of inhibiting pre-emergent growth of unwanted vegetation which comprises treating the growing medium with a phytotoxic amount of N-benzyloxyalkyl-N-ethyl-alpha-chloroacetamide wherein the alkyl moiety is a divalent alkylene of from two to four carbon atoms.

11. The method of inhibiting pre-emergent growth of unwanted vegetation which comprises treating the growing medium with a phytotoxic amount of N-benzyloxypropyl-N-alkyl-alpha-chloroacetamide wherein the alkyl moiety has up to eight carbon atoms.

12. A herbicidal composition which comprises a wetting agent and a compound of the formula

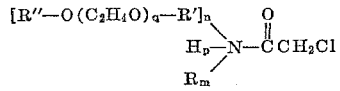

wherein R is selected from the class consisting of benzyl, furfuryl, alkyl having up to eight carbon atoms, cyclohexylmethyl and allyl; wherein R' is a divalent alkylene radical of from two to four carbon atoms; wherein R'' is selected from the class consisting of benzyl, cyclohexylmethyl, cyclohexenylmethyl, allyl, furfuryl, tetrahydrofurfuryl and alkyl having up to ten carbon atoms; wherein $n$ is an integer from one to two; wherein $p$ is an integer from zero to one; wherein $m$ is an integer from zero to one; wherein $q$ is an integer from zero to two; and wherein the sum of $m$, $n$ and $p$ is always two.

References Cited by the Examiner
UNITED STATES PATENTS

| | | | |
|---|---|---|---|
| 2,338,177 | 1/1944 | Graenacher | 260—561 |
| 2,338,178 | 1/1944 | Graenacher | 260—561 |
| 2,722,479 | 11/1955 | Mangham | 71—2.7 |
| 2,762,696 | 9/1956 | Gerjovich | 71—2.6 |
| 2,765,338 | 10/1956 | Suter | 260—562 |
| 2,771,468 | 11/1956 | Martin et al. | 260—562 |
| 2,864,683 | 12/1958 | Hamm et al | 71—2.3 |
| 2,892,696 | 6/1959 | Barrows | 71—2.7 |
| 2,893,857 | 7/1959 | De Pree | 71—2.7 |
| 3,141,758 | 7/1964 | Hamm et al | 71—2.6 |

OTHER REFERENCES

Albrecht et al.: Helv. Chem. Acta, vol. 24, p. 237 E.
Jacobs et al.: J. Biol. Chem., vol. 21, p. 415 (1915).
Suter et al.: J. Liebig's Annalen der Chemie, vol. 576, pp. 224 to 228 (1952).

LEWIS GOTTS, *Primary Examiner.*

JAMES O. THOMAS, JR., *Examiner.*